US 6,604,437 B1

(12) United States Patent
Yamada et al.

(10) Patent No.: US 6,604,437 B1
(45) Date of Patent: Aug. 12, 2003

(54) INTERMITTENT TRANSMISSION APPARATUS

(75) Inventors: Hiromitsu Yamada, Higashiosaka (JP); Ryosuke Nogami, Izumi (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/937,237

(22) PCT Filed: Mar. 23, 1999

(86) PCT No.: PCT/JP99/01458

§ 371 (c)(1),
(2), (4) Date: Jan. 7, 2002

(87) PCT Pub. No.: WO00/57086

PCT Pub. Date: Sep. 28, 2000

(51) Int. Cl.$^7$ .............................................. F16H 27/04
(52) U.S. Cl. ................. 74/24; 74/436; 74/437
(58) Field of Search ................. 74/436, 437, 415, 74/24

(56) References Cited

U.S. PATENT DOCUMENTS

| 2,606,235 | A | | 8/1952 | Penk ........................... 201/34 |
| 3,813,952 | A | * | 6/1974 | Fehrenbacher ............... 74/84 R |
| 3,840,107 | A | * | 10/1974 | Mack et al. ................. 400/185 |
| 3,855,873 | A | * | 12/1974 | Fletcher et al. ............... 74/436 |
| 4,109,548 | A | * | 8/1978 | Shinohara et al. ............. 74/569 |
| 5,906,134 | A | * | 5/1999 | Yamada ........................ 74/436 |
| 6,234,047 | B1 | * | 5/2001 | Yamada ........................ 74/820 |

OTHER PUBLICATIONS

Microfilm of the specification and drawings annexed to the request of Japanese Utility Model Application No. 50–96795 (Laid–open No. 52–13280) (Hitachi, Ltd.), Jan. 29, 1977, Fig. 3.
CD–ROM of the specification and drawings annexed to the request of Japanese Utility Model Application No. 4–76117 (Laid open No. 6–40507) (Shiikuan Chen), May 31, 1994, Fig. 1.

* cited by examiner

Primary Examiner—David A. Bucci
Assistant Examiner—Justin Stefanon
(74) Attorney, Agent, or Firm—Webb Ziesenheim Logsdon Orkin & Hanson P.C.

(57) ABSTRACT

An intermittent transmission apparatus according to this invention, broadly, includes a driving element and a driven element. The driving element comprises a first cam having a first cam surface, a second cam having a second cam surface, and an intermediate member displaced between the first and second cams. The driven element comprises a driven element main body having recesses for contacting a plurality of rollers arranged on the intermediate member, bearings erected on the driven element main body to be pushed by the first cam surface, and bearings erected under the driven element main body to be pushed by the second cam surface. During non-drive period of the driven element, the bearings contact a circular arc surface of the second cam, and further the recesses contact the plurality of rollers, to restrict rotation of the driven element.

20 Claims, 6 Drawing Sheets

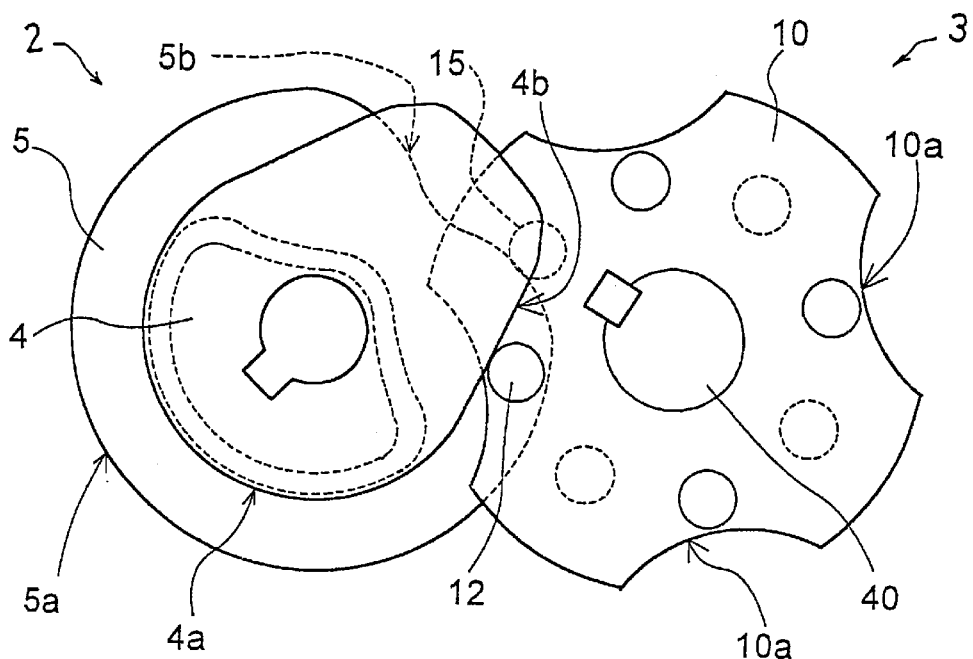
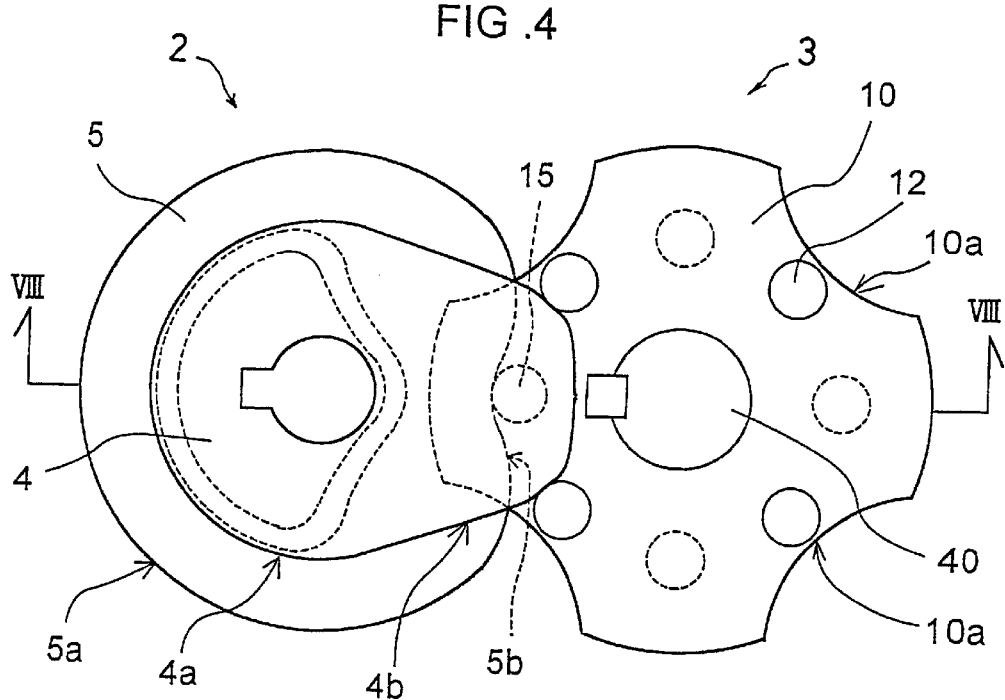

INTERMITTENT TRANSMISSION APPARATUS

BACKGROUND OF THE INVENTION

1. Field of the Invention

This invention relates to an improvement in an intermittent transmission apparatus for transmitting inputted torque drive as intermittent torque drive.

2. Description of Related Art

A Geneva gear is known as an example of intermittent transmission apparatus for outputting continuous torque drive input as intermittent torque drive. That is, the Geneva gear is capable of alternately producing a drive period in which chive is transmitted to an output shaft, and a non-drive period in which drive is not transmitted to the output shaft.

A conventional and commonly seen Geneva gear, as shown in FIG. 12 has a center portion formed of a driving element D1 and a driven element D2. The driving element D1 includes a member B1 supporting an engaging pin P, and a member B2 having a driving element recess R1 and a circular arc surface S. The driven element D2 includes a member B3 defining four driven element recesses R2 for engaging the engaging pin P and four circular arc recessed surfaces R3 corresponding to said circular arc surface S.

When the driving element D1 rotates, the engaging pin P engages one of the four driven element recesses R2 to rotate the driven element D2 by 90 degrees. At this time, tips of the member B3 of driven element D2 enter the recess R1 provided on the driving element D1, thereby to be allowed to rotate with the driving element D1.

After the 90-degree rotation, the engaging pin P moves out of the recess R2 of driven element D2 while the driving element D1 continues to rotate. Rotation of the driven element D2 is restricted for a fixed period by slidable contact between a recess R3 and the circular arc surface S of driving element D1. This is repeated, whereby continuous rotation of the driving element D1 is transmitted as intermittent rotational motion to the driven element D2.

With such a Geneva gear, when a reactive force is applied from the driven element D2 to the driving element D1 while rotation of the driven element is restricted, this force is received only by the engaging pin P of driving element D1. Thus, it is sometimes inadequate to cope with a strong reactive force only by means of the engaging pin P.

This invention intends to provide improvements over the conventional Geneva gear.

SUMMARY OF THE INVENTION

An intermittent transmission apparatus according to this invention also may, broadly, be divided into a driving element and a driven element. The driving element includes a first cam having a first cam surface, a second cam having a second cam surface and a circular arc surface, and an intermediate member having a rotation restricting means. The driven element includes first engaged members for contacting the first cam surface, second engaged members for contacting the second cam surface, and a driven element main body having recesses for contacting the rotation restricting means.

In the intermittent transmission apparatus according to this invention, during non-drive periods of the driven element, the recesses of the driven element main body contact the rotation restricting means provided on the intermediate member of the driving element, in addition to the second engaged members contacting the circular arc surface of the second cam. Thus, during the non-drive periods, rotation is restricted by two methods, and even when a reactive force acts on the driven element, a strong reactive force may be dealt with sufficiently.

Torque drive is transmitted from the driving element to the driven element through the cam surfaces. By varying the shapes of the cam surfaces, a desired profile of output rotating angle may be obtained.

Other features and advantages of this invention will be apparent from the following description and drawings illustrating embodiments of the invention.

BRIEF DESCRIPTION OF THE DRAWINGS

FIGS. 2–6 are plan views showing a driving element at different angles to a driven element by way of explanation of action of the intermittent transmission apparatus according to this invention shown in FIG. 1;

DETAILED DESCRIPTION OF THE PREFERRED EMBODIMENTS

Next, an intermittent transmission apparatus according to this invention will be described with reference to the accompanying drawings.

Figure 1:
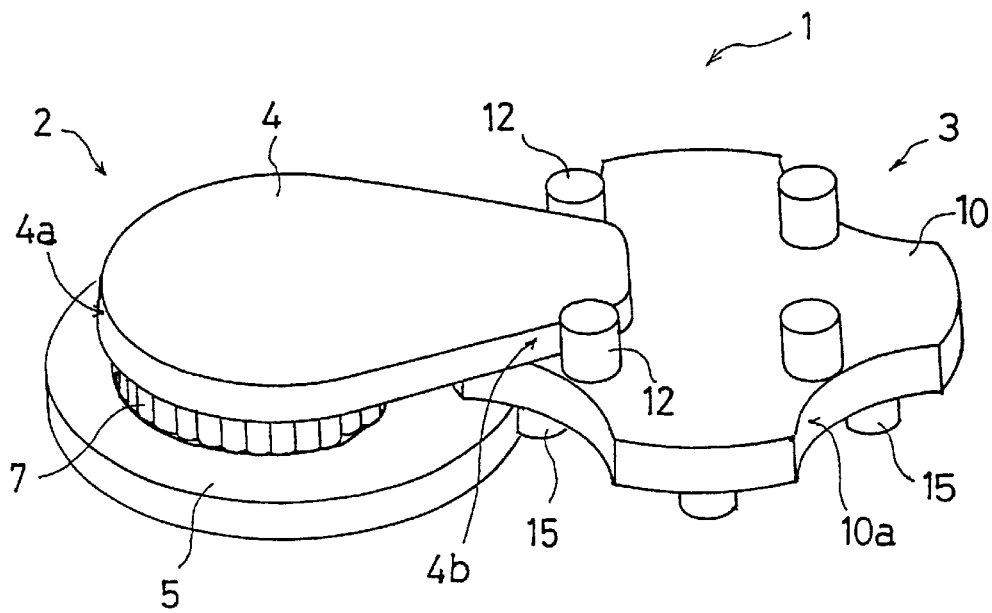
FIG. 1 is a perspective view showing an intermittent transmission apparatus according to this invention.

FIG. 1 shows an intermittent transmission apparatus 1 in a preferred embodiment of this invention. As described above, the intermittent transmission apparatus 1 is an apparatus for providing intermittent drive by repeating a drive period and a non-drive period. During a drive period, drive by a set angle is outputted in response to continuous torque drive inputted. This is followed by a fixed period, i.e. a non-drive period (non-transmission period), during which drive is not transmitted. Thereafter, drive by the set angle is outputted again.

Such an intermittent transmission apparatus may be used in various fields. Recently, in particular, the intermittent transmission apparatus has often been expected to make a very accurate movement when used as part of equipment for manufacturing LSI or the like.

An overall construction of intermittent transmission apparatus 1 according to this invention will be described first with reference to FIG. 1. The intermittent transmission apparatus 1 generally includes a driving element 2 rotated continuously, and a driven element 3 driven intermittently by the driving element 2. Here, the driven element 3 rotates 90 degrees while the driving element 2 rotates 180 degrees. The driving element 2 has a central portion thereof with a three-layer structure. In FIG. 1, a first cam 4 is disposed in an uppermost position. This first cam 4 defines a first circular arc surface 4a, and a first cam surface 4b for contacting the driven element 3.

Figure 2:
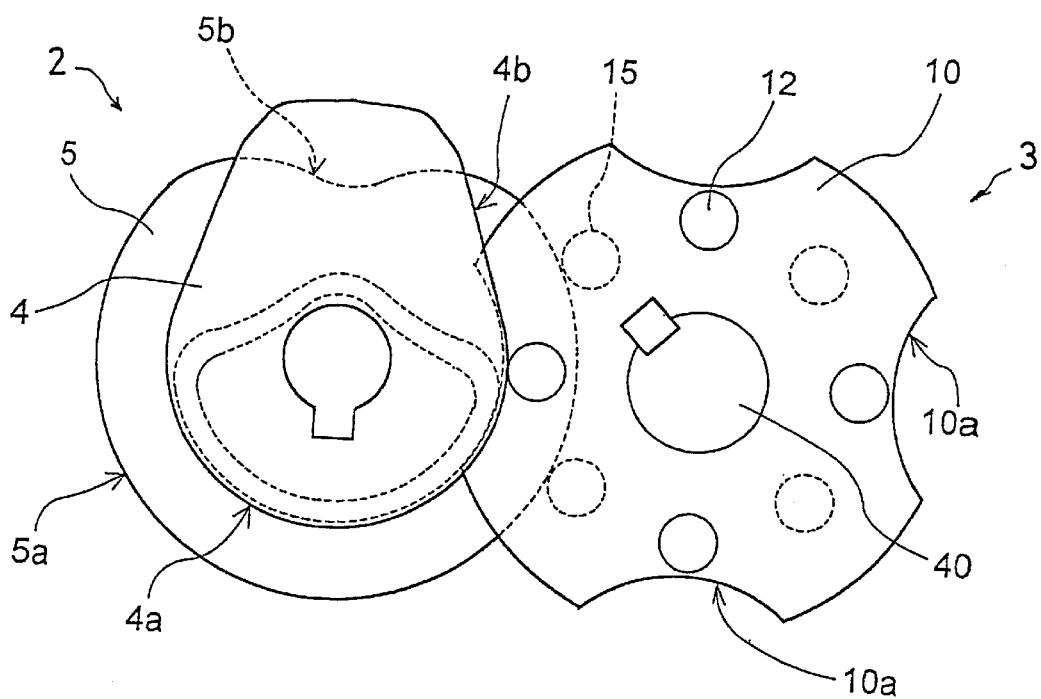

Rollers 7 acting as rolling members constituting a rotation restricting means are arranged under the first cam 4. A second cam 5 is disposed under the rollers 7. As shown in FIG. 2, this second cam 5 has, formed on side surfaces thereof, a second circular arc surface 5a, and a second cam surface 5b defining a recess.

The driven element 3 also has a central portion thereof with a three-layer structure. A main body 10 of the driven element has four first engageable rollers 12 arranged thereon as spaced apart in the cirucmferential direction to act as first engaged members. The main body 10 of the driven element has four arcuate recesses 10a arranged equidistantly on peripheral surfaces thereof. The main body 10 of the driven element has four second engageable rollers 15 arranged thereunder as spaced apart from one another to act as second engaged members 15 for contacting the second cam 5. As shown FIG. 1 and FIGS. 2 through 6, in plan view, the first engageable rollers 12 are arranged in regions of bottom portions of the arcuate recesses 10a, respectively, and the second engageable rollers 15 are arranged between the first engageable rollers 12.

Before describing a detailed construction of intermittent transmission apparatus 1 according to this invention, how this intermittent transmission apparatus 1 operates will be described with reference to FIGS. 2 through 6.

First, at least two functional portions are required of the intermittent transmission apparatus 1. One is a portion for rotating the driven element 3 by the set angle. The other is a portion for restricting a further rotation of the driven element 3 after the driven element 3 is rotated by the set angle.

The first cam surface 4b of the first cam 4 and the second cam surface 5b of the second cam 5 of the driving element 2 constitute the portion for contacting the first engageable rollers 12 of the driven element 3 and rotating the driven element 3.

FIG. 2 shows a position about to start driving the driven element 3, with a first engageable roller 12 of the driven element 3 contacting the first circular arc surface 4a of the diving element 2. That is, this intermittent transmission apparatus 1 is in a position for starting a drive period.

Figure 5:
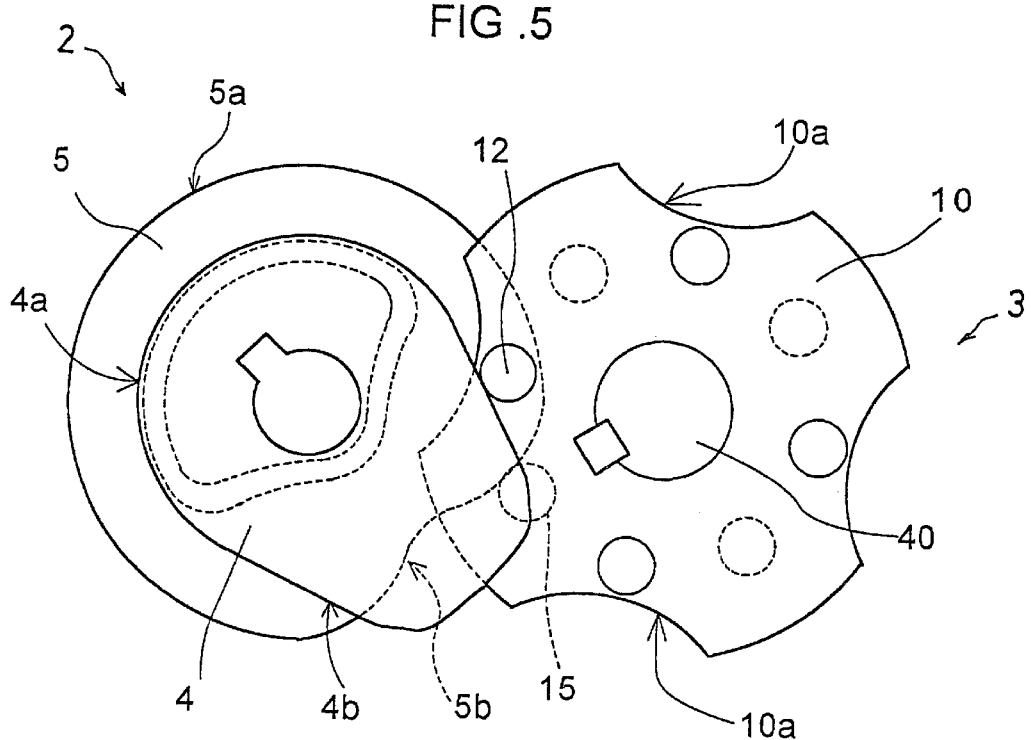

FIG. 3 shows a position in which the driving element 2 has rotated by about 45 degrees from this state. Here, the driven element 3 is rotated by the driving element 2, with the first engageable roller 12 contacting the first cam surface 4b of the driving element 2. At this time, a second engageable roller 15 of the driven element 3 lies in the recess 5b of the second cam 5 of the driving element 2. FIG. 4 shows a position in which the driving element 2 has rotated further by about 45 degrees. For the driving element 2 to rotate the driven element 3 further from this point of time, as shown in FIG. 5, the surface 5b defining the recess of the second cam of the driving element 2 contacts the second engageable roller 15. In this way, the driven element 3 is rotated by the driving element 2 by the angle of 90 degrees.

Figure 6:
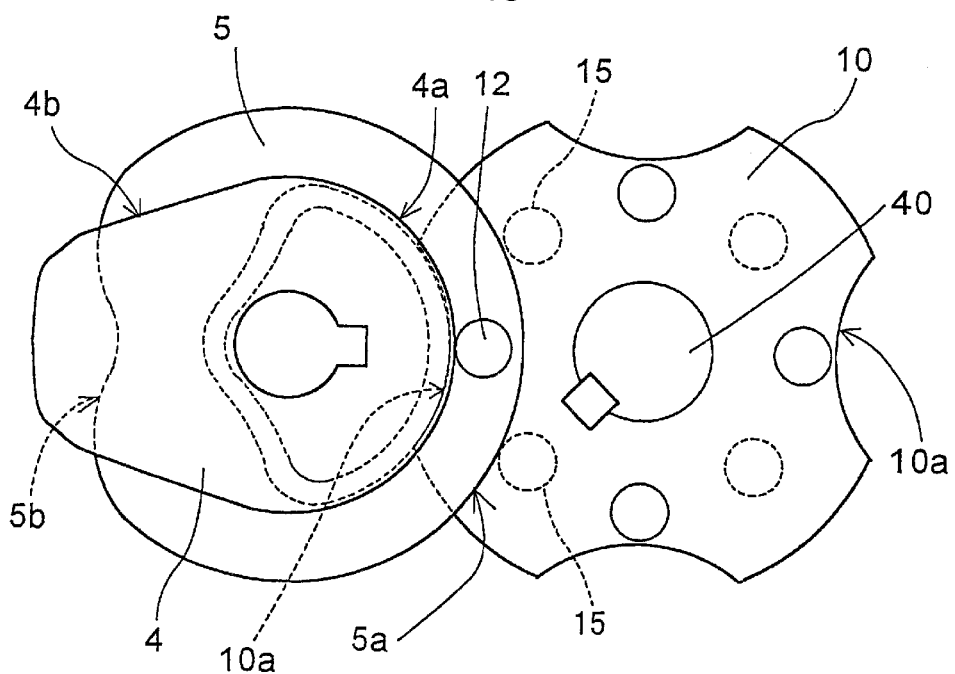

Thereafter, while the driving element 2 continues to rotate, the driven element 3 does not rotate. During this period, in this embodiment, as shown in FIG. 6, rotation of the driven element 3 is restricted by sliding relative to the rollers 7 of a recess 10a of the driven element 3, and contact between two second engageable rollers 15 and the second circular arc surface 5a.

Next, the construction of intermittent transmission apparatus 1 will be described in detail with reference to FIGS. 1, 7 and 8.

Figure 8:
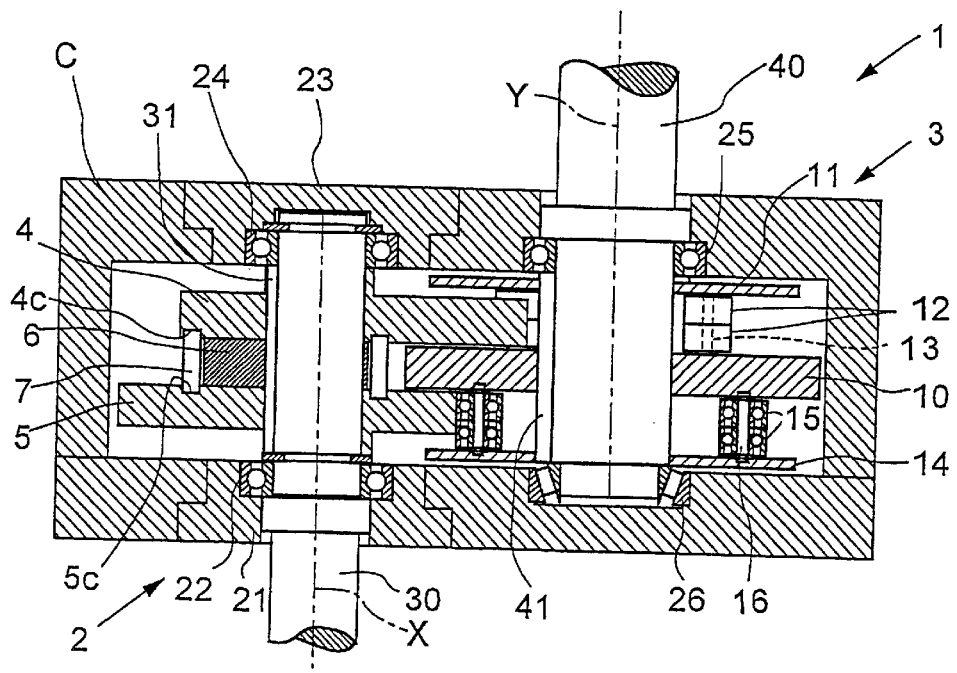
FIG. 8 is a sectional view of the intermittent transmission apparatus according to this invention shown in FIG. 1 which is in the state shown in FIG. 4.

FIG. 8 is a sectional view of the intermittent transmission apparatus 1. Shown here are an input shaft 30, and an axis X thereof, for continuously inputting torque drive to the driving element 2. This input shaft 30 is operatively connected to a driving device not shown. This input shaft 30 is attached at a lower end thereof to a support member 21 through an ordinary bearing mechanism 22. The upper end of input shaft 30 is attached to a support member 23 through a bearing mechanism 24. Each of the support members 21 and 23 has a circular plane profile. In plan view, the axis X of said input shaft 30 is slightly offset from the center of the circles of support members 21 and 23. With this construction, by rotating one or both of the support members 21 and 23 relative to a case C, a subtle adjustment may be made of the position of the axis X of the input shaft 30 relative to the driven element 3.

The input shaft 30 has a groove formed in a peripheral surface thereof and extending in the direction of axis X. The first cam 4, second cam 5 and intermediate member 6 have recesses formed axially inwardly and opposed to said groove. A stopper 31 is disposed between the groove and recesses so that these rotate with the input shaft 30.

Next, the shapes in plan view of the first cam surface 4b of the first cam 4 and the second cam surface 5b of the second cam 5 shown in FIGS. 1 and 2 will be described. These first cam surface 4b and second cam surface 5b are portions excluding the circular arc surface 4a of the first cam 4 and the circular arc portion 5b of the second cam 5, respectively. The second cam surface 5b defines the recess indented radially inwardly from the circular arc surface 5a of the second cam 5.

The driven element 3 is driven by the first cam surface 4b and second cam surface 5b contacting the first engaged members 12 and second engaged members 15 described in detail hereinafter, respectively. More particularly, in the first half of a drive period, the driven element 3 is driven by the driving element 2 by the first cam surface 4b slidably contacting a first engaged member 12. In the second half of the drive period, the driven element 3 is driven successively by the driving element 2 by the second cam surface 5b contacting a second engaged member 15.

Figure 9:
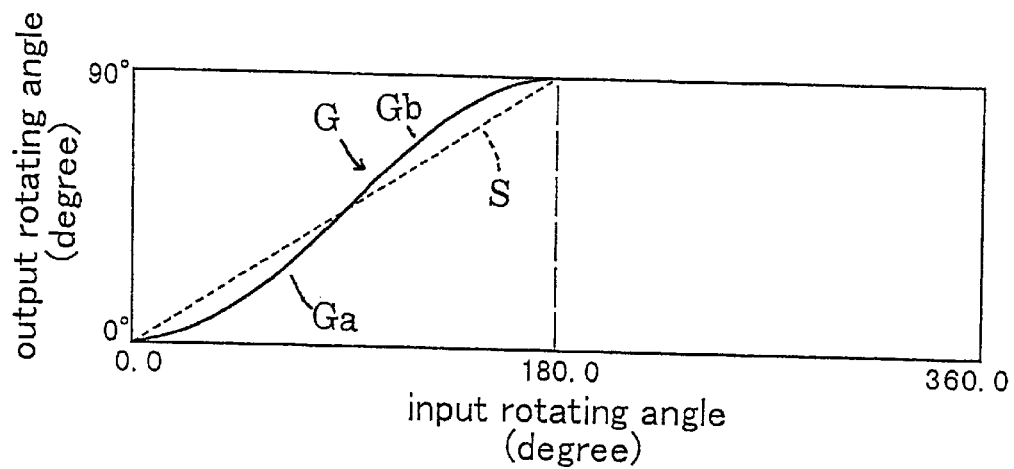
FIG. 9 is a graph showing output rotating angles as a function of input rotating angles from the driving element.

The shapes in plan view of the first cam surface 4b and second cam surface 5b are such that the output rotating angle of an output shaft 40 based on the input rotating angle of the input shaft 30 has a profile corresponding to graph G shown in a solid line in FIG. 9. This FIG. 9 has an origin of the input rotating angle set to the starting point of a drive period with the first cam 4 directed straight upward as shown in FIG. 2. The time taken from this position until the first cam 4 is directed straight downward in FIG. 9 corresponds to the drive period. The time taken until the first cam 4 thereafter rotates clockwise in FIG. 9 back to the position in FIG. 2 corresponds to a non-drive period.

Assume here that the input shaft 30 has a fixed input angular velocity of rotation. Then, in the graph of FIG. 9, the shape of graph G of the output rotating angle remains the same where a time axis is used instead of the input rotating angle. In this case, the period from 0 to 90 degrees of the input rotating angle corresponds to a first half region of a drive period. The period from 90 to 180 degrees corresponds to a second half region of the drive period. The position of 90 degrees of the input rotating angle is the midpoint of the drive period. The portion of graph G corresponding to the first half of the drive period and the portion corresponding to the second half are indicated by Ga and Gb. It will be seen from this that the angular velocity of the output rotating angle is proportional to the inclination angle of a tangent at each position on the graph G in FIG. 9.

The dotted line S in FIG. 9 is a straight line linking the origin of the graph and the point of a maximum output rotating angle (which is 90 degrees in this embodiment) where the input rotating angle in the drive period is 180 degrees. Thus, this straight line S represents an output rotating angle resulting from the input rotating angle when torque drive is transmitted at a fixed angular velocity.

Because of the shapes of the first cam surface 4b and second cam surface 5b, the angular velocity of the output rotating angle is zero in the vicinity of zero input rotating angle (i.e. the starting point of a drive period), and in the vicinity of 180 input angle (the finishing point of the drive period). Thus, in the intermittent transmission apparatus according to this invention, a smooth shift may be made from a non-drive state to a drive state at the beginning and end of a drive period without imparting a shock to the driven element due to rapid acceleration.

In at least a large part of the first half region of a drive period, the output rotating angle has a positive angular acceleration. In at least a large part of the second half region of a drive period, the output rotating angle has a negative angular acceleration.

In addition, the point at which the angular acceleration becomes zero during one of said drive periods from 0 to 180 degrees of the input rotating angle is only the starting point of the drive period, the finishing point of the drive period, and one point which is the midpoint between the starting point and finishing point.

Other features will readily be apparent from FIG. 9 to those in the trade.

Next, the plurality of rolling members 7 of the rotation restricting means arranged between the first cam 4 and second cam 5 will be described. These rolling members 7 are all cylindrical rollers 7 in this embodiment. The cylindrical rolling members 7 have a characteristic that sliding contact among the rollers occur on lines so that the rollers 7 have a reduced chance of wear. The rollers 7 include metal rollers 7a and plastic rollers 7b arranged alternately. This arrangement is effective to suppress noise due to sliding contact between metals.

Each roller 7, while itself rotating, is movable around the intermediate member 6 disposed between the first cam 4 and second cam 5. As shown in FIG. 8, these rollers 7 move as guided by both a first guide groove 4c formed in the lower surface of the first cam 4 and a second guide groove 5c formed in the upper surface of the second cam 5. These first and second guide grooves, and outer peripheral surfaces 6a, 6b of the intermediate member 6 to be described hereinafter, constitute a guide means. The shape of these first guide groove 4c and second guide groove 5c is shown in FIG. 7.

Figure 7:
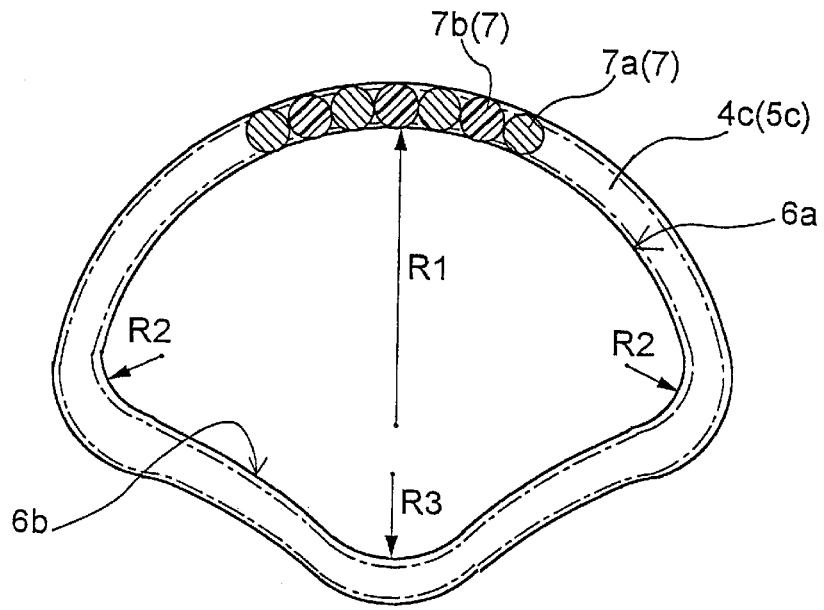
FIG. 7 is a view showing a shape of a guide groove formed in an intermediate member provided for the driving element for guiding rolling members.

As shown in FIG. 7, the intermediate member 6 defines an arcuate side surface 6a with a radius of curvature R1, and a non-arcuate side surface 6b. The non-arcuate side surface 6b is recessed radially inwardly so that, during a drive period, neither the intermediate member 6 nor the rotation restricting means 7 may contact the portions (radially projecting portions) other than the recesses 10a of the main body 10 of the driven element.

In FIG. 8, though not depicted in detail for simplicity, the peripheral surfaces 6a and 6b of the intermediate member 6 are arranged radially outwardly of radially inward sides, with respect to the first axis, of the first guide groove 4c of the first cam 4 and the second guide groove 5c of the second cam 5. Consequently, when the intermittent transmission apparatus is in a non-drive period, with rotation of the driven element 3 restricted and the rollers 7 in sliding contact with a recess 10a of the main body 10 of the driven element, the plurality of cylindrical rollers 7 move in contact with the arcuate peripheral surface 6a of the intermediate member 6.

Of the radii of curvature R1, R2 and R3 in plan view of curved portions of the guide means, the smallest radius of curvature R2 is substantially larger than the radius of rollers 7. Thus, the guide means has no sharp corner, thereby promoting movement of rollers 7 circumferentially of the guide means.

Further, even if the first guide groove 4c of the first cam 4 and the second guide groove 5c of the second cam 5 slightly differ in size from the rollers, the rollers 7 may contact the recesses 10a of the driven element 3 accurately by making the rollers 7 cylindrical, and accurately cutting the arcuate peripheral surface 6a of the intermediate member 6. The peripheral surface 6a of the intermediate member 6 may also be made an accurate circular arc relatively simply since the intermediate member 6 may be shaped while turning it on a lathe, for example.

Figure 11:
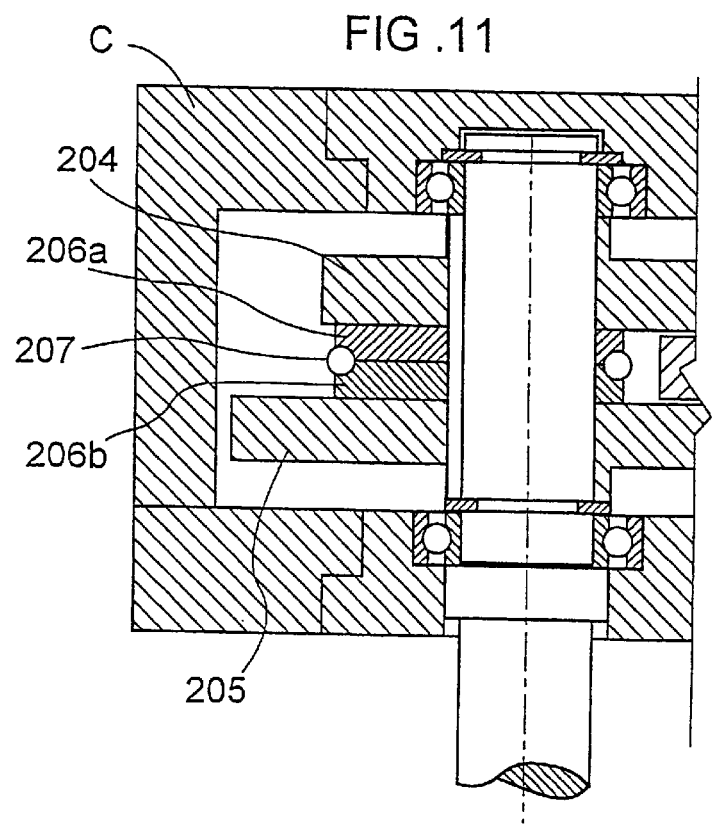
FIG. 11 is a sectional view showing an intermittent transmission apparatus in a further embodiment of this invention.
Figure 12:
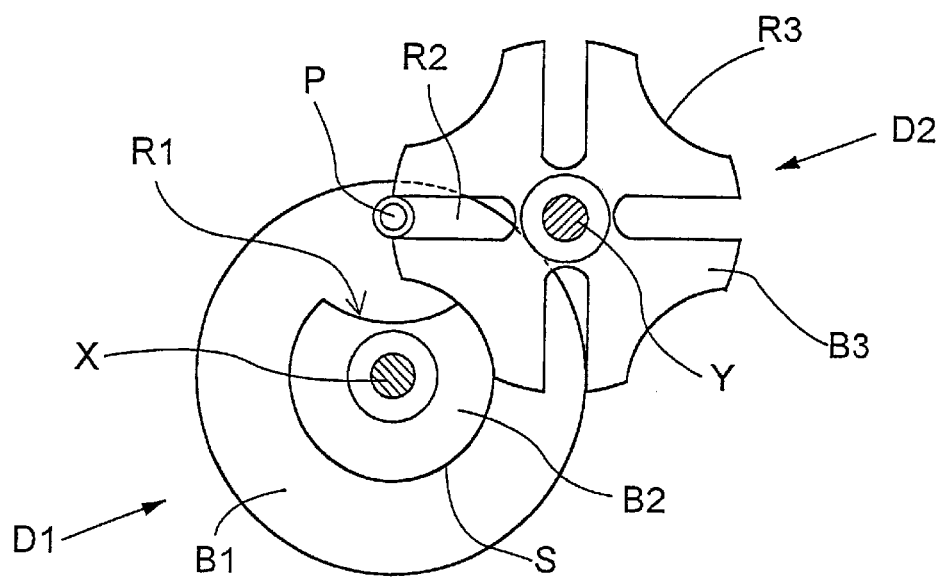
FIG. 12 is a view showing a Geneva gear which is one example of conventional intermittent transmission apparatus.

The rolling members may of course be formed as spherical members 207 as shown in FIG. 11. In this case, it is necessary to manufacture the intermediate member as divided into two, upper and lower portions 206a and 206b, and cut these portions to form a guide groove for guiding the spherical members 207. The guide groove needs to define an opening circumferentially of the intermediate member, which is smaller than the diameter of the spherical members 207 to prevent spilling of the spherical members 207. In this case, there is no need to form the groove in the first cam 204 or second cam 205 to receive rollers. This guide groove has a shape in plan view having features of the guide means described hereinbefore.

Next, the construction of driven element 3 will be described in detail with reference to FIG. 8.

The output shaft 40 associated with the driven element 3 is supported by the case C through bearing mechanisms 25 and 26 to be rotatable about a second axis Y. The output shaft 40 has a conical bottom portion, and the bearing mechanism 26 has a roller bearing for slidably contacting the bottom portion. This provides a sufficient support against a force applied downward in FIG. 8 to the output shaft 40. The connection between the output shaft 40 and the main body 10 of the driven element is the same as in the case of the drive shaft 30. The output shaft 40 has a groove formed in a surface thereof and extending in the direction of axis Y. A stopper 41 is engaged between this groove and a groove formed in an engaging bore in the main body 10 of the driven element for engagement with the output shaft 40.

The main body 10 of the driven element has four first engageable rollers 12 arranged on the upper surface thereof to act as the first engaged members. These are arranged in a corresponding relationship to bottom regions of the arcuate recesses 10a formed in the side surfaces of the main body 10 of the driven element. The first engageable rollers 12 have axis members 13 supported between the main body 10 of the driven element and an upper disk 11 fixed to the output shaft 40 to be rotatable together, and tubular members 12 freely rotatable about the axis members 13. The tubular members 12 have two, upper and lower bearings.

The second engageable rollers 15 arranged under the main body 10 of the driven element to act as the second engaged members has the same structure as the first engageable rollers 12. That is, the second engageable rollers 15 have axis members 16 supported between the main body 10 of the driven element and a lower disk 14 fixed to the output shaft 40 to be rotatable together, and tubular members 15 freely rotatable about the axis members 16. The tubular members 15 have two, upper and lower bearings.

Next, a further embodiment of this invention will be described with reference to FIG. 10.

In the preferred embodiment described above, the driven element 3 is rotated 90 degrees while the driving element 2 rotates 180 degrees, and thereafter rotation of the driven element 3 is restricted while the driving element 2 rotates a further 180 degrees.

Figure 10:
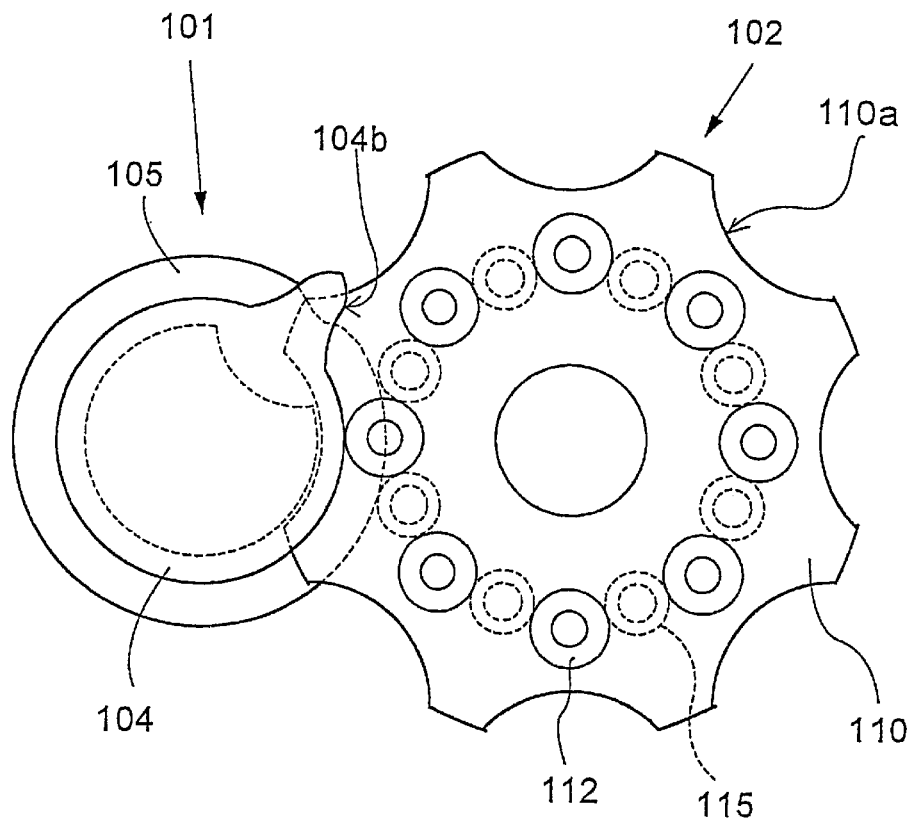
FIG. 10 is a plan view showing an intermittent transmission apparatus in another embodiment of this invention.

In the intermittent transmission apparatus shown in FIG. 10, a driven element 102 is rotated 45 degrees while a driving element 101 rotates 180 degrees, and thereafter rotation of the driven element 102 is restricted while the driving element 101 rotates a further 180 degrees.

As seen from FIG. 10, a first cam 104 and a second cam 105 corresponding to the above preferred embodiment define a first cam surface 104b and a second cam surface, respectively. These are contactable with first noncontact members 112 and second noncontact members 115. The first cam surface 104b and second cam surface have shapes in plan view to provide the profile of the output rotating angle described in the foregoing preferred embodiment.

The first noncontact members 112 have eight roller members arranged on the upper surface of a main body 110 of the driven element. The second noncontact members 115 have eight roller members arranged under the main body 110 of the driven element. These rollers have the same structure as in the foregoing preferred embodiment. The main body 110 of the driven element similarly defines eight recesses 110a for contacting a rotation restricting means disposed between the first cam 104 and second cam 105.

As other features of this further embodiment, the features of the foregoing preferred embodiment may be incorporated as long as no contradiction occurs.

These two embodiments use the rotation restricting means having a plurality of rolling members. To further simplifies the construction, instead of using the rolling members, an arcuate surface may be formed peripherally of the intermediate member for slidably contacting the recesses of the driven element.

Other features apparent from the description herein and the accompanying drawings are also included in the scope of his invention.

What is claimed is:

1. In an intermittent transmission apparatus wherein continuous torque drive applied to driving element rotatable about a first axis is transmitted to a driven element rotatable about a second axis only during a drive period, and said torque drive is not transmitted to the driven element during a non-drive period, said driving element comprises:

a first cam having a first cam surface;

a second cam displaced from the first cam in a direction along said first axis, and having a second cam surface and a circular arc surface; and an intermediate member displaced from said first cam and said second cam in the direction along said first axis and having a rotation restricting means; and said driven element comprises:

first engaged members contactable by said first cam surface to receive said torque drive from said driving element during at least part of said drive period;

second engaged members contactable by said second cam surface to receive said torque drive from said driving element during at least part of said drive period, and contactable by said circular arc surface of said second cam to restrict rotation of said driven element during at least part of said non-drive period; and a main body of the driven element disposed in a position corresponding to said intermediate member of said driving element in a direction along said second axis, and having recesses on a peripheral surface of said main body, each of said recesses being provided with a contact surface for contacting said rotation restricting means of the intermediate element to restrict rotation of said driven element during at least part of said non-drive period.

2. An intermittent transmission apparatus as defined in claim 1, wherein said intermediate member is disposed between said first cam and second cam in the direction of said first axis.

3. An intermittent transmission apparatus as defined in claim 1, wherein said first engaged members are tubular members projecting from said main body of the driven element in a direction parallel to said second axis.

4. An intermittent transmission apparatus as defined in claim 1, wherein said second engaged members are tubular members projecting from said main body of the driven element in a direction parallel to said second axis and opposite to said first engaged members.

5. An intermittent transmission apparatus as defined in claim 4, wherein said tubular members are rotatable bout axis portions thereof.

6. An intermittent transmission apparatus as defined in claim 3, wherein said tubular members are rotatable about axis portions thereof.

7. An intermittent transmission apparatus as defined in claim 6, wherein said tubular members having bearings rotatable about said axis portions.

8. An intermittent transmission apparatus as defined in claim 1, wherein said rotation restricting means has a plurality of rolling members.

9. An intermittent transmission apparatus as defined in claim 8, wherein said rolling members are tubular rollers.

10. An intermittent transmission apparatus as defined in claim 8, wherein said rolling members are spherical members.

11. An intermittent transmission apparatus as defined in claim 8, wherein each of said plurality of rolling members is rotatable and movable along a guide means circumferentially of said first axis.

12. An intermittent transmission apparatus as defined in claim 11, wherein said guide means has grooves formed in a lower surface of said first cam and an upper surface of said second cam, respectively.

13. An intermittent transmission apparatus as defined in claim 11, wherein said guide means has an arcuate guide surface formed peripherally of said intermediate member, said rolling members contacting said guide surface at least while said rolling members are in contact with said driven element.

14. An intermittent transmission apparatus as defined in claim 11, wherein said guide means has a shape of a closed curve in plan view, the closed curve including an inner curve having a minimum radius of curvature larger than a radius of said rolling members.

15. An intermittent transmission apparatus as defined in claim 8, wherein said plurality of rolling members have plastic rolling members and metallic rolling members arranged alternately.

16. An intermittent transmission apparatus as defined in claim 1, wherein said first engaged members are arranged in a corresponding relationship with positions of bottoms of said recesses formed in the main body of the driven element, and said second engaged members are arranged between said first engaged members in plan view.

17. An intermittent transmission apparatus as defined in claim 1, wherein said driven element is driven by said driving element with said first cam surface of said first cam contacting said first engaged members during the first half of said drive period, and said driven element is driven by said driving element with said second cain surface of said second cam contacting said second engaged members during the second half of said drive period.

18. An intermittent transmission apparatus as defined in claim 1, wherein shapes in plan view of said first cam surface and said second cam surface are such that, where an output rotating angle of said driven element during said drive period is a function of an input rotating angle of said driving element, the output rotating angle has a positive angular acceleration at least during a large part of a first half region of said drive period, and the output rotating angle has a negative angular acceleration at least during a large part of a second half region of said drive period.

19. An intermittent transmission apparatus as defined in claim 18, wherein the shapes in plan view of said first cam surface and said second cam surface are such that, points at which said angular acceleration becomes zero during each said drive period are only a starting point of said drive period, a finishing point of said drive period, and only one point between said starting point and said finishing point.

20. In an intermittent transmission apparatus wherein continuous torque drive applied to driving element rotatable about a first axis is transmitted to a driven element rotatable about a second axis only during a drive period, and said torque drive is not transmitted to the driven element during a non-drive period, said driving element comprises:

a first cam having a first cam surface;

a second cam displaced from the first cam in a direction along said first axis, and having a second cam surface and a circular arc surface; and an intermediate member displaced from said first cam and said second cam in the direction along said first axis and having a rotation restricting means; and said driven element comprises:

first engaged members contactable by said first cam surface to receive said torque drive from said driving element during at least part of said drive period;

second engaged members contactable by said second cam surface to receive said torque drive from said driving element during at least part of said drive period, and contactable by said circular arc surface of said second cam to restrict rotation of said driven element during at least part of said non-drive period; and a main body of the driven element disposed in a position corresponding to said intermediate member of said driving element in a direction along said second axis and having recesses on a peripheral surface of said main body, each of said recesses being provided with a solid contact surface for contacting said rotation restricting means of the intermediate element to restrict rotation of said driven element during at least part of said non-drive period.

\* \* \* \* \*

UNITED STATES PATENT AND TRADEMARK OFFICE
CERTIFICATE OF CORRECTION

PATENT NO. : 6,604,437 B1
DATED : August 12, 2003
INVENTOR(S) : Hiromitsu Yamada et al.

It is certified that error appears in the above-identified patent and that said Letters Patent is hereby corrected as shown below:

Title page,
Item [73], Assignee, "Kubota Corporation" should read -- Nissin Manufacturing Co., Ltd. and Japan Science and Technology Corporation --.

Column 1,
Line 16, "chive" should read -- drive --.

Column 3,
Line 47, "diving" should read -- driving --.

Column 6,
Line 12, "comer" should read -- corner --.

Column 7,
Line 41, "simplifies" should read -- simplify --.
Line 48, "his" should read -- this --.

Column 8,
Line 31, "bout" should read -- about --.

Column 9,
Line 14, "cain" should read -- cam --.

Signed and Sealed this

Ninth Day of December, 2003

JAMES E. ROGAN
*Director of the United States Patent and Trademark Office*